United States Patent
Muller

(10) Patent No.: US 10,509,542 B2
(45) Date of Patent: *Dec. 17, 2019

(54) INTEGRATED MULTIDIMENSIONAL VIEW OF HIERARCHICAL OBJECTS

(71) Applicant: International Business Machines Corporation, Armonk, NY (US)

(72) Inventor: Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 430 days.

This patent is subject to a terminal disclaimer.

(21) Appl. No.: 15/378,158

(22) Filed: Dec. 14, 2016

(65) Prior Publication Data

US 2017/0090701 A1   Mar. 30, 2017

Related U.S. Application Data

(63) Continuation of application No. 11/318,805, filed on Dec. 27, 2005, now Pat. No. 9,557,887.

(51) Int. Cl.
*G06F 3/0482* (2013.01)
*G06F 3/0481* (2013.01)

(52) U.S. Cl.
CPC .......... *G06F 3/0482* (2013.01); *G06F 3/0481* (2013.01); *G06F 3/04817* (2013.01)

(58) Field of Classification Search
CPC ... G06F 3/0481; G06F 3/04817; G06F 3/0482
See application file for complete search history.

(56) References Cited

U.S. PATENT DOCUMENTS

| | | |
|---|---|---|
| 5,596,702 A | 1/1997 | Stucka et al. |
| 5,877,775 A | 3/1999 | Theisen et al. |
| 5,917,492 A | 6/1999 | Bereiter et al. |
| 5,999,179 A | 12/1999 | Kekic |
| 6,111,578 A | 8/2000 | Tesler |
| 6,151,024 A | 11/2000 | Alimpich et al. |
| 6,154,750 A | 11/2000 | Roberge et al. |
| 6,211,877 B1 | 4/2001 | Steele et al. |
| 6,226,647 B1 | 5/2001 | Venkatasubramanian et al. |

(Continued)

OTHER PUBLICATIONS

Juan Trujillo, "The Gold model: An Object Oriented multidimensional Data Model . . . "; University of Alicante, Research Group of Logic Programming and Information Systems.

(Continued)

*Primary Examiner* — William L Bashore
*Assistant Examiner* — Gregory A Distefano
(74) *Attorney, Agent, or Firm* — Steven M. Greenberg, Esq.; Shutts & Bowen LLP

(57) ABSTRACT

Embodiments of the present invention address deficiencies of the art in respect to the display of multidimensional structures and provide a method, system and computer program product for managing an integrated multidimensional view of a structured collection of objects. In one embodiment of the invention, a data processing system can be configured to render an integrated view of a multidimensional structured collection of objects. The data processing system can include a GUI for a host application in a computing platform and multidimensional view processing logic coupled to the host application. The logic can include program code enabled to render a single, integrated multidimensional view of a structured collection of objects in the GUI.

15 Claims, 2 Drawing Sheets

(56) References Cited

U.S. PATENT DOCUMENTS

| | | |
|---|---|---|
| 6,278,465 B1 | 8/2001 | Kohavi et al. |
| 6,281,896 B1 | 8/2001 | Alimpich et al. |
| 6,437,812 B1 | 8/2002 | Giles et al. |
| 6,647,394 B1 | 11/2003 | Herzberg et al. |
| 6,718,386 B1 | 4/2004 | Hanfland |
| 6,775,675 B1 | 8/2004 | Nwabueze et al. |
| 6,842,176 B2 | 1/2005 | Sang'udi et al. |
| 7,062,718 B2 | 6/2006 | Kodosky et al. |
| 7,197,561 B1 | 3/2007 | Lovy |
| 7,203,701 B1 | 4/2007 | Packebush et al. |
| 7,363,583 B1 | 4/2008 | Costa |
| 2004/0078722 A1 | 4/2004 | Pfeiffer et al. |
| 2004/0243938 A1 | 12/2004 | Weise et al. |
| 2005/0033773 A1 | 2/2005 | Roberge et al. |
| 2005/0065955 A1 | 3/2005 | Babikov et al. |
| 2005/0091356 A1 | 4/2005 | Izzo |
| 2005/0132304 A1 | 6/2005 | Guido |

OTHER PUBLICATIONS

Thanh Binh Nguyen et al, "An Object Oriented Multidimensional Data Model for OLAP", Institute of Applied Knowledge Processing, University of Linz.

INTEGRATED MULTIDIMENSIONAL VIEW OF HIERARCHICAL OBJECTS

This application is a continuation of and claims priority to U.S. patent application Ser. No. 11/318,805, filed Dec. 27, 2005, the disclosure of which is hereby incorporated by reference.

BACKGROUND OF THE INVENTION

Field of the Invention

The present invention relates to object hierarchies and more particularly to the visual presentation of a structured collection of objects in a graphical user interface (GUI).

Description of the Related Art

Electronic objects in a data processing system often are organized hierarchically in a parent-child relationship. Specifically, the earliest file systems for computing environments provided a hierarchical directory structure in which electronically stored documents could be stored in specific directories or folders. Directories and folders, collectively viewed as containers, could be nested to provide a level of organization for electronic documents akin to a tree having a root node, leaf nodes and intermediate branches and connecting nodes.

Contemporary data structure theory expands upon the notion of the hierarchical directory structure to provide the most common form of genus-species data organization not only for file storage, but for general objects in memory as well. While hierarchical trees are known to be constructed programmatically in a number of ways, the most common way is the linked list of nodes in a tree formation. Generally, the hierarchical tree can be visually rendered in a GUI by providing collapsible nodes such that the hierarchy can be viewed merely as a root node, or the hierarchy can be viewed in fully expanded form to reveal the hierarchical tree. Of course, as each node in the hierarchy can be expanded or collapsed individually, any portion of the hierarchical tree can be viewed within the GUI is most computing users have become accustomed to understand.

While the conventional hierarchical tree structure has proven quite effective in illustrating one-dimensional parent-child relationships among stored objects in a structured collection, the modern GUI is at a loss to illustrate multidimensional relationships in a structured collection of objects. Yet, many stored objects enjoy multi-faceted relationships including, not only parent-child relationships, but also membership and access privileges relationships, date, time and place relationships, related resources relationships, and alerts, notifications and alarms relationships. For example, a structured collection of tasks in an activity not only can include an ordering of tasks and nested sub-tasks, but also the structured collection of tasks can be viewed from the perspective of users permitted access to modify certain tasks, resources required to complete certain tasks, or dates, times and places for performing certain tasks.

Recognizing the multidimensional nature of structured collections of objects, conventional solutions propose the juxtaposition of different hierarchical trees within a GUI to provide different views of the structured collection, where each hierarchical tree is of only one dimension of interest. For example, in U.S. Pat. No. 6,151,024 to Alimpich et al. for DATA PROCESSOR CONTROLLED DISPLAY INTERFACE WITH TREE HIERARCHY OF ELEMENTS VIEW EXPANDABLE INTO MULTIPLE DETAILED VIEWS, upon selection of a parent object in a tree hierarchy, the child objects for the parent are displayed in multiple, different views in separate screen regions in order to display attributes of one of the different types of child objects.

The type of solution provided by Alimpich et al. is also apparent in U.S. Pat. No. 6,281,896 to Alimpich et al. for DATA PROCESSOR CONTROLLED DISPLAY INTERFACE WITH TREE HIERARCHY OF ELEMENTS VIEW EXPANDABLE INTO MULTIPLE DETAILED VIEWS, in U.S. Pat. No. 6,647,394. to Herzberg et al. for DOING BUSINESS EMPLOYED LINKED TREES HAVING RETRIEVABLE EMBEDDED INFORMATION, and in U.S. Pat. No. 6,842,176 Sang'udi et al. COMPUTER RELATED METHOD AND SYSTEM FOR CONTROLLING DATA VISUALIZATION IN EXTERNAL DIMENSION(S). In all such cases, however, separate views are provided for each dimension resulting in a cluttered screen and incoherent presentation for the end user.

BRIEF SUMMARY OF THE INVENTION

Embodiments of the present invention address deficiencies of the art in respect to the display of multidimensional structures and provide a novel and non-obvious method, system and computer program product for managing an integrated multidimensional view of a structured collection of objects. In one embodiment of the invention, a data processing system can be configured to render an integrated view of a multidimensional structured collection of objects. The data processing system can include a GUI for a host application in a computing platform and multidimensional view processing logic coupled to the host application. The logic can include program code enabled to render a single, integrated multidimensional view of a structured collection of objects in the GUI.

In another embodiment of the invention, a method for managing an integrated multidimensional view of a structured collection of objects in a GUI can be provided. The method can include providing a view of at least a portion of objects in the structured collection of objects according to a first dimension, selecting one of the objects in the provided view, and embedding within the provided view an in-line view of attributes of the selected one of the objects according to a second dimension. Optionally, the method also can include concurrently embedding within the provided view an in-line view of attributes of a different selected one of the objects according to a third dimension. Finally, as yet another option, selecting one of the objects in the provided view can include selecting an activatable icon from among at least two activatable icons associated with the selected one of the objects, the selected activatable icon having an association with the second dimension.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing an integrated multidimensional view of a structured collection of objects. In accordance with an embodiment of the present invention, a single, integrated view of structured collection of objects can be provided. Each object of the single, integrated view can be configured for selectively providing an in-line view of two or more different dimensions for the object. In this way, different portions of the provided view can provide a sub-view of the structured collection of objects according to one of many dimensions. Yet, the entire single, integrated view need not reflect only a single dimension.

Figure 1:
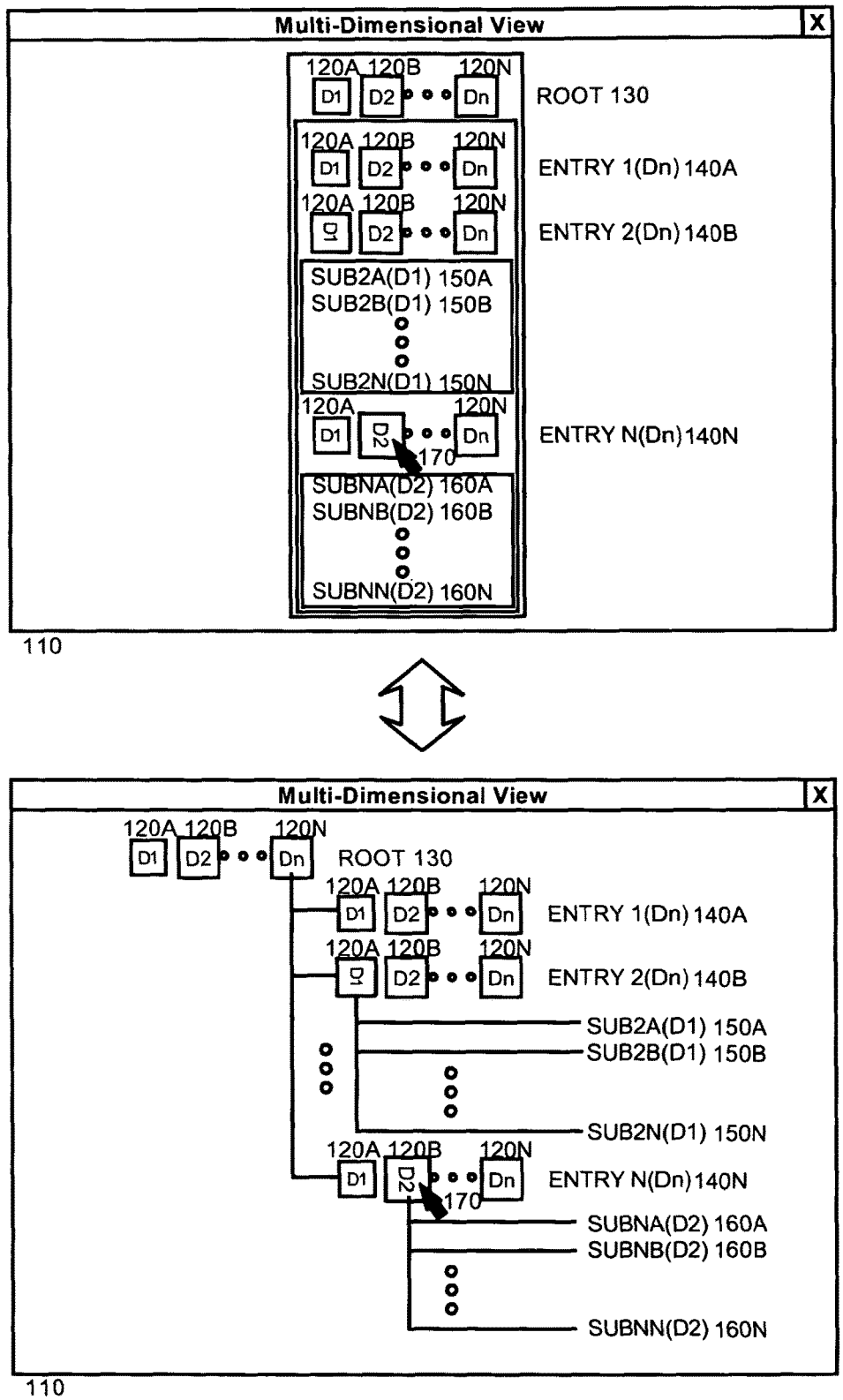
FIG. 1 is a pictorial illustration of an integrated multidimensional view of a structured collection of objects.

In further illustration, FIG. 1 is a pictorial illustration of two exemplary integrated multidimensional views of a structured collection objects. In a first aspect of the invention, the structured collection can be viewed in-line, while in a second aspect of the invention, the structured collection can be viewed hierarchically in a tree view. In either case, as shown in FIG. 1, an integrated multidimensional view of objects 110 can define a hierarchy having a root node 130, one or more leaf nodes 150A, 150B, 150N, 160A, 160B, 160N and one or more intermediate nodes 140A, 140B, 140N. Each one of the intermediate nodes 140A, 140B, 140N can define a branch of nodes for the integrated multidimensional hierarchical view 110. Notably, each of the root node 130 and intermediate nodes 140A, 140B, 140N can include an activatable icon 120A, 120B, 120N, each of the activatable icons representing a viewable dimension for a branch of nodes below the corresponding one of the root node 130 and intermediate nodes 140A, 140B, 140N.

In this regard, the selection of one of the activatable icons 120A, 120B, 120N for a particular one of the root node 130 and intermediate nodes 140A, 140B, 140N can result in the rendering of an in-line view of a sub-hierarchy of intermediate nodes 140A, 140B, 140N and leaf nodes 150A, 150B, 150N, 160A, 160B, 160N based upon the dimension associated with the selected one of the activatable icons 120A, 120B, 120N. Optionally, more than one of the activatable icons 120A, 120B, 120N can be concurrently selected for the root node 130 or any of the intermediate nodes 140A, 140B, 140N. Consequently, multiple hierarchies for different dimensions for the root node 130 or any one of the intermediate nodes 140A, 140B, 140N can be displayed adjacent to one another within the a single, integrated multidimensional view of the structured collection of objects 110.

Figure 2:
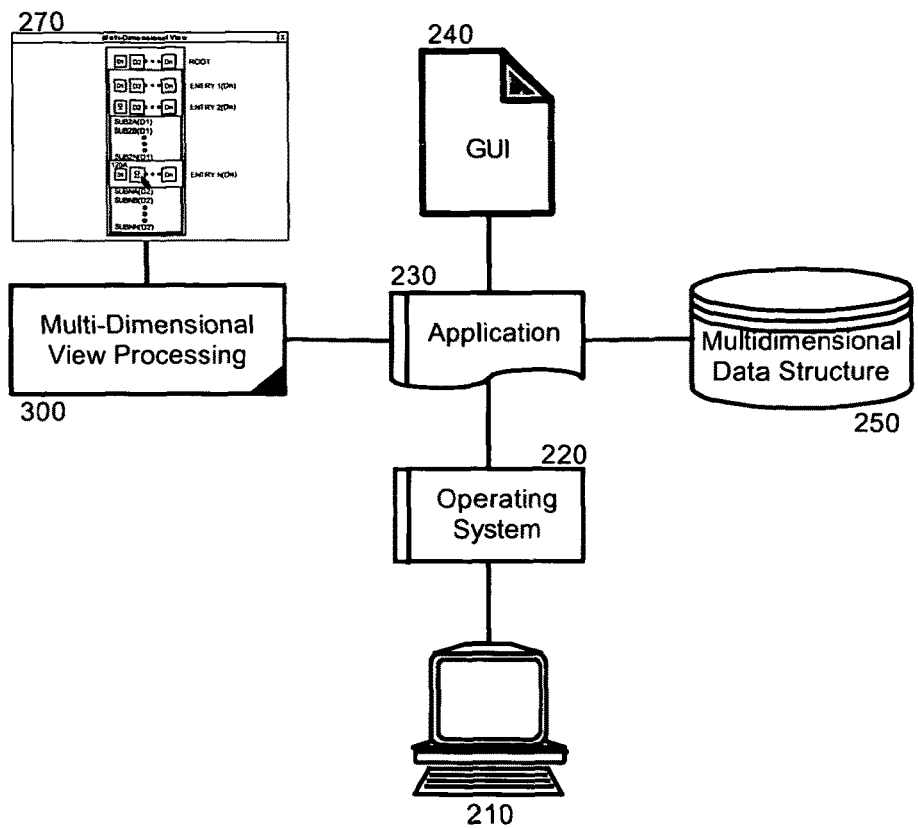
FIG. 2 is a schematic illustration of a data processing system configured to manage an integrated multidimensional view of a structured collection of objects; and, FIG. 3 is a flow chart illustrating a process for managing an integrated multidimensional view of a structured collection of objects.

Notably, the integrated multidimensional view of a structured collection of objects 110 can be managed within a data processing system. Specifically, FIG. 2 is a schematic illustration of a data processing system configured to manage an integrated multidimensional view of a structured collection of objects. As shown in FIG. 2, the data processing system can include a host computing platform 210 arranged with a graphical operating system 220. The graphical operating system 220 can be configured to generate a GUI 240 for a hosted application 230. In this regard, as it is well-known in the art, the operating system 220 can include graphical resources exposed to applications through an application programming interface that can be invoked for display by application logic.

The hosted application 230 can be enabled to include a multidimensional data structure 250. The multidimensional data structure can include a structured collection of objects which can be related to one another differently depending upon a defined relationship. For instance, each defined relationship can be a dimension and can include parent-child, membership and access privileges, date, time and places, related resources, alerts, notifications and alarms to name a few different dimensions of relationship between objects in the hierarchy. Multidimensional view processing logic 300 can be coupled to the host application 230 and can provide a single, integrated multidimensional view 270 of the structured collection of objects in the multidimensional data structure 250.

In this regard, the multidimensional view processing logic 300 can provide a view of multiple activatable icons for each different dimension adjacent to each node of the integrated multidimensional view 270. Responsive to the activation of an activatable icon for a selected object in the structured collection of objects, an in-line view can be rendered within the provided view for the selected object. Importantly, the in-line view can be rendered according to dimension associated with the activatable icon. More particularly, the objects represented by the objects of the in-line view can be arranged according to the attribute defined for the dimension of the activated icon.

Figure 3:
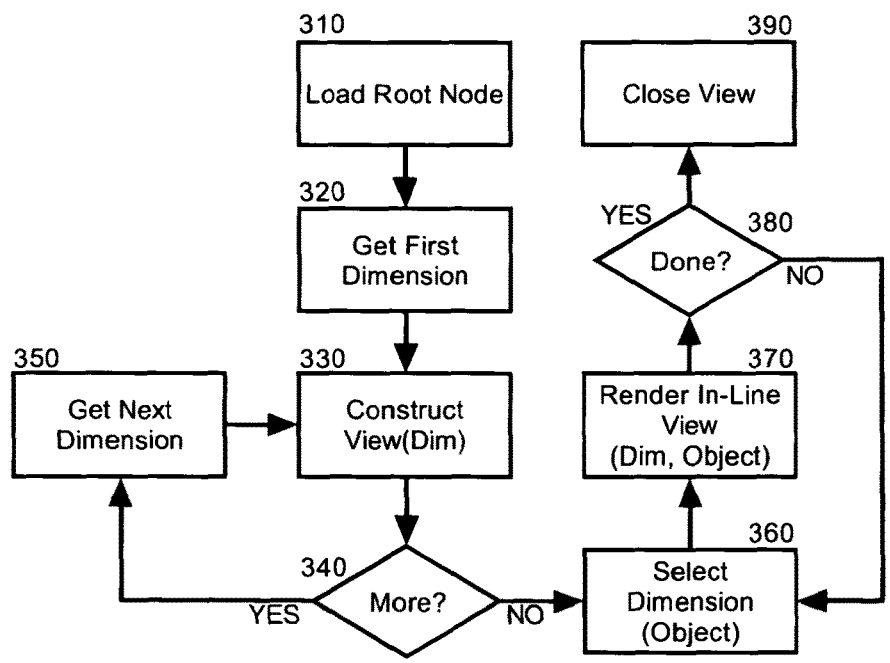

In further illustration, FIG. 3 is a flow chart illustrating a process for managing an integrated multidimensional view of a structured collection of objects. Beginning in block 310, a root node for a structured collection of objects of a multidimensional data structure can be loaded and a first dimension can be selected for processing in block 320. In block 330, a view of the structured collection of objects for the multidimensional data structure can be constructed according to a relationship specified by the selected dimension. Subsequently, in decision block 340, if additional dimensions remain to be considered, a next dimension can be selected in block 350 and the process can repeat in block 330.

In decision block 340, when no further dimensions remain to be considered, in block 360 one of the dimensions can be selected for viewing. Subsequently, in block 370 the objects for an in-line view can be rendered to reflect the selected one of the dimensions. In decision block 380, if additional selections for different dimensions remain, the process can repeat in block 360. Otherwise, the process can end in block 390.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. An electronic device for rendering an integrated view of a multidimensional structured collection of objects, comprising:
at least one processor that executes computer usable program code to render a single graphical user interface (GUI) on a display for a host application; and
multidimensional view processing logic coupled to the host application, the logic comprising program code that, when executed by the processor, renders a single multidimensional view of a structured collection of unique objects on the display, wherein different dimensions in the single multidimensional view correspond to different relationships among selected ones of the objects in a parent-child relationship and also at least one of a membership and access privileges relationship, a date, time and places relationship, and an alerts, and notifications and alarms relationship, each relationship selectively rendered responsive to selecting a corresponding activatable icon among a plurality of activatable icons, the activatable icons disposed along a first dimension whereby selection of each activatable icon causes each relationship to be rendered in a different dimension.

2. The electronic device of claim 1, wherein the single multidimensional view of the structured collection of unique objects comprises:
a hierarchy of objects comprising a root node coupled to a plurality of intermediate nodes terminating with a plurality of leaf nodes; and,
the plurality of activatable icons associated with each node of the plurality of intermediate nodes in the hierarchy, each of the activatable icons corresponding to a different dimension, each activatable icon comprising a configuration responsive to a selection of the activatable icon for rendering a sub-hierarchy below an associated node arranged according to the corresponding dimension.

3. The electronic device of claim 2, wherein each activatable icon for the associated node is configured to be selected concurrently with at least one other activatable icon for the associated node.

4. A method for managing an integrated multidimensional view of objects in a graphical user interface (GUI), the method comprising:
rendering, on a display of an electronic device, a single multidimensional view of at least a portion of objects in a structured collection of unique objects according to a first dimension in a single GUI;
selecting one of the unique objects in the single multidimensional view; and
embedding, within the single multidimensional view, an in-line view of attributes of the selected one of the unique objects according to a second dimension,
the different dimensions in the single multidimensional view corresponding to different relationships among selected ones of the objects and the single multidimensional view consisting of a parent-child relationship and also at least one of: a membership and access privileges relationship; a date, time and places relationship; and an alerts, and notifications and alarms relationship, each relationship selectively rendered responsive to selecting a corresponding activatable icon of a plurality of activatable icons, the activatable icons disposed along a first dimension whereby selection of each activatable icon causes each relationship to be rendered in a different dimension than the first dimension.

5. The method of claim 4, further comprising, concurrently embedding a different in-line view of attributes for a different selected one of the objects according to a third dimension.

6. The method of claim 5, further comprising:
selecting a different one of the objects in the single multidimensional view; and,
embedding, in the single multidimensional view, a different a different in-line view of attributes for the selected different one of the objects according to a third dimension.

7. The method of claim 6, wherein selecting one of the objects in the single multidimensional view, comprises selecting an activatable icon from among the activatable icons associated with the selected one of the objects, the selected activatable icon having an association with the second dimension.

8. The method of claim 6, wherein selecting one of the objects in the single multidimensional view, comprises selecting an activatable icon from among a plurality of activatable icons associated with the selected one of the objects, the selected activatable icon having an association with the second dimension.

9. The method of claim 6, wherein selecting a different one of the objects in the single multidimensional view, comprises selecting an activatable icon from among a plurality of activatable icons associated with the selected different one of the objects, the selected activatable icon having an association with the third dimension.

10. A computer program product comprising a non-transitory computer usable storage medium storing computer usable program code, which when executed by at least one processor, for managing an integrated multidimensional view of a hierarchy of objects in a graphical user interface (GUI) rendered on a display of an electronic device, the computer program product including:

computer usable program code, which when executed by the processor, for rendering a single multidimensional view of at least a portion of objects in the structured collection of unique objects according to a first dimension in a single GUI on the display;

the computer usable program code further for selecting one of the unique objects in the single multidimensional view; and, the computer usable program code further for embedding within the single multidimensional view an in-line view of attributes of the selected one of the unique objects according to a second dimension, the different dimensions in the single multidimensional view corresponding to different relationships among selected ones of the objects and consisting of a parent-child relationship and also at least one of: a membership and access privileges relationship; a date, time and places relationship; and an alerts, and notifications and alarms relationship, each relationship selectively rendered responsive to selecting a corresponding activatable icon of a plurality of activatable icons, the activatable icons disposed along a first dimension whereby selection of each activatable icon causes each relationship to be rendered in a different dimension than the first dimension.

11. The computer program product of claim 10, further comprising, computer usable program code for concurrently embedding in the structured collection of objects a different in-line view of attributes of a different selected one of the objects according to a third dimension.

12. The computer program code of claim 10, further comprising:

computer usable program code for selecting a different one of the objects in the single multidimensional view; and, computer usable program code for embedding, within the single multidimensional view, a different in-line view of attributes of the selected different one of the objects according to a third dimension.

13. The computer program product of claim 10, wherein the computer usable program code for selecting one of the objects in the single multidimensional view, comprises computer usable program code for selecting an activatable icon from among the activatable icons associated with the selected one of the objects, the selected activatable icon having an association with the second dimension.

14. The computer program product of claim 10, wherein the computer usable program code for selecting one of the objects in the single multidimensional view, comprises computer usable program code for selecting an activatable icon from among a plurality of activatable icons associated with the selected one of the objects, the selected activatable icon having an association with the second dimension.

15. The computer program product of claim 10, wherein the computer usable program code for selecting one of the objects in the single multidimensional view, comprises computer usable program code for selecting an activatable icon from among a plurality of activatable icons associated with the selected one of the objects, the selected activatable icon having an association with the third dimension.

* * * * *